United States Patent [19]
Burke et al.

[11] Patent Number: 6,052,382
[45] Date of Patent: Apr. 18, 2000

[54] CONFIGURABLE MEDIATION DEVICES AND SYSTEMS

[75] Inventors: Sean Patrick Burke, Los Angeles; Michael V. Harding, Santa Monica; Santosh Alexander, Marina Del Rey; Conor P. Dowling; Gerry A. Egan, both of Santa Monica; David S. Spencer, Redondo Beach, all of Calif.; Bernd Grohmann, Berlin; Guenter H. Krauss, Bad Homburg, both of Germany; Stephen B. Flynn, Campbell; Steven J. Urow, Santa Monica, both of Calif.

[73] Assignee: Telops Management, Inc., Pleasanton, Calif.

[21] Appl. No.: 08/792,290

[22] Filed: Jan. 31, 1997

(Under 37 CFR 1.47)

[51] Int. Cl.[7] ....................................................... H04J 3/16
[52] U.S. Cl. .......................... 370/466; 370/230; 370/401; 370/469; 395/200.55; 395/885
[58] Field of Search .................................... 370/280, 300, 370/321, 349, 395, 401, 465, 466, 467, 469, 522, 903, 230, 235, 265, 402; 395/200.53, 200.54, 200.55, 882, 885

[56] References Cited

U.S. PATENT DOCUMENTS

| | | | |
|---|---|---|---|
| 4,979,169 | 12/1990 | Almond et al. ........................... | 370/466 |
| 5,586,273 | 12/1996 | Blair et al. ................................. | 370/466 |
| 5,640,386 | 6/1997 | Wiedeman ................................. | 370/321 |
| 5,640,446 | 6/1997 | Everett et al. ............................. | 370/401 |
| 5,787,255 | 7/1998 | Parlan et al. .............................. | 370/349 |
| 5,892,950 | 4/1999 | Rigori et al. .............................. | 370/903 |

OTHER PUBLICATIONS

Telops Management Inc. "Information—centric OSs Implementing the Pardigm Shift", Oct. 16, 1995.
Jakobson and Weissman "Alarm Correlation" IEEE Network, Nov. 1993 pp 52–59.

Primary Examiner—Douglas W. Olms
Assistant Examiner—Shick Hom
Attorney, Agent, or Firm—Edward W. Callan

[57] ABSTRACT

A device for mediating information management in a communications network for communications with a given network element having a given management-information protocol includes a NEDL file defining a structured network-element-description-language (NEDL) format referencing information-management roles pertaining to the given network element in accordance with the network-element management-information protocol; and a processor coupled to the NEDL file for recomposing messages received from of for communication to the network element. The mediation device may be configured for a given network element by adapting the NEDL file to define the management roles, parameters and resources of the given network element. Configurable systems for mediating information management between one or more network elements respectively having different management-information protocols and one or more operations support systems respectively having different management-information protocols include one or more mediation devices and a control unit for selectively connecting and/or configuring the mediation device(s) for mediating information management between selected network element(s) and selected operations support system(s). Computer readable storage media for use with a processor included in an information-management system are configured for causing and/or enabling a processor to perform various functions, respectively including (i) recognizing different predetermined message patterns within received messages and (ii) recomposing received messages.

49 Claims, 5 Drawing Sheets

CONFIGURABLE MEDIATION DEVICES AND SYSTEMS

BACKGROUND OF THE INVENTION

The present invention generally pertains to communications systems and is particularly directed to mediating communications between a first device having a given protocol and a second device having a different protocol, such as mediating information management in a communications network between a network element having a given management-information protocol and an operations support system having a different management-information protocol.

In a network, such a telecommunication network, the network elements are devices for providing various functions, such as switching and multiplexing; and information pertaining to aspects of the network elements referred to herein as resources is managed by one or more operations support systems for such purposes as logging and discriminating alarms, handling performance data and for performing other functions. Examples of resources include switches, input-output controllers and responder amplifiers. Management information is communicated between the operations support systems and the network elements as messages respectively pertaining to a given resource. These messages include a collection of information management roles pertaining to the given resource selected from among a resource "description" role, a resource "identification" role, a resource "attribute" role and an attribute "value" role. The "description" role identifies the network element by ID number and describes the type of resource, such as a switch. The "identification" role identifies the resource by ID number. The "attribute" role identifies a given attribute of the resource, such as the position of the switch. The "value" role specifies a value of the resource, such as an open or closed position of the switch.

Management-information messages sent by the operations support system to network elements in a telecommunications network are classified as GET, SET and ACTION messages. A GET message requests specified information pertaining to an attribute of the resource. A SET message requests that a specified action affecting a value of an attribute of the resource be taken. An ACTION message requests that a specified action be performed by a specified resource, without specifying an attribute of the resource. A response message sent by the network element to the operations support system is associated with the GET, SET and ACTION request messages. These response messages are either the response requested by a GET message, a confirmation that the action requested by a SET or ACTION message was taken, an ACK (acknowledgment) that the request message was received, or an error message. In addition to such responses to a request message the network elements also send autonomous messages to the operations support system, such as an ALARM message.

Typically an operations support system is embodied in a computer system that includes computer hardware operating under control of a software operating system and typically includes an application program written with an application program interface (API) for execution on the computer system under control of a computer operating system. Standardized management-information protocols for such operations support systems, such as CMIP and SNMP, have been provided by various organizations, such as ITU (International Telecommunications Union), IETF (Internet Engineering Task Force), Bellcore (Bell Communications Research), and ANSI (American National Standards Institute).

Some existing network elements, such as the model ADM-2000 manufactured by AT&T and the model FLM-600 manufactured by Fujitsu, have a management-information protocol, such as TL1, that is different from the standardized management-information protocols of the widely used operations support systems, such as CMIP and SNMP. Also, whereas the GDMO standard is used for describing resources and the ASN.1 standard is used for defining the data format for individual resources for communications in accordance with the CMIP protocol, and the SMI standard is used many for describing resources for communications in accordance with the SNMP protocol, existing network elements not having such a standardized management-information protocol typically are only ASCII or bitstream based and have no formal management information description.

A mediation device is used for interfacing a network element with an operations support system having a management-information protocol that is different from the management-information protocol of the network element. Such a mediation device recomposes messages received from the operations support system for communication to the network element to be in accordance with the management-information protocol for the network-element and recomposes messages received from the network element for communication to the operations support system to be in accordance with the operations-support-system management-information protocol. Such a mediation device includes a file mapping an association between the resources and resource attributes of a network element having a given management-information protocol, such as TL1, and the descriptions of the resources and resource attributes of an operations support system having a different management-information protocol, such as the GDMO/ASN.1 resource and resource attribute descriptions used in accordance with the CMIP protocol.

The present invention provides a device for mediating information management in a communications network between a network element having a given management-information protocol and an operations support system having a different management-information protocol, comprising a NEDL file defining a structured network-element-description-language (NEDL) format referencing information-management roles pertaining to the given network element in accordance with the network-element management-information protocol; and a processor coupled to the NEDL file and adapted for recomposing messages received for communication to the network element to be in accordance with the network-element management-information protocol and for recomposing messages received from the network element for communication to the operations support system to be in accordance with the operations-support-system management-information protocol.

Preferably, the network-element-description-language format includes a plurality of different predetermined message patterns respectively containing different combinations of references to blocks of parameters respectively having a defined syntax and an assigned information-management role; and the NEDL file also defines resources of the network element in terms of information managed by the messages, wherein the resources definition includes constructs respectively defining descriptions of the information pertaining to the resource, attributes of the information pertaining to the resource and those of the different message patterns that apply to the resource.

In another aspect, the present invention provides a device for mediating information management in a communications network for communications with a given network element having a given management-information protocol, comprising a NEDL file defining a structured network-element-description-language (NEDL) format referencing information-management roles pertaining to the given network element in accordance with said network-element management-information protocol and in accordance with an intermediate management-information protocol that is different from said network-element management-information protocol; and a NEDL processor coupled to the NEDL file and adapted for recomposing messages received for communication to the network element to be in accordance with said network-element management-information protocol and for recomposing messages received from the network element for further communication to be in accordance with said intermediate management-information protocol.

In accordance with this aspect of the present invention, mediation of information management between the network element and an operations support system having a management-information protocol that is different from the network-element management-information protocol and the intermediate management-information protocol may be accomplished by combining the mediation device with an application interface device that is adapted for mediating information management for communications between the NEDL processor and the operations support system.

By combining a mediation device and an application interface device having a common intermediate management-information protocol for mediating information management in a communications network between a network element having a given management-information protocol and an operations support system having a different management-information protocol, one is able to utilize a standardized mediation device for a given network element without regard to the information-management protocol of the operations support system and one is able to utilize a standardized application interface device for a given operations support system without regard to the information-management protocol of the network element.

The mediation device of the present invention may be configured for a given network element by adapting the NEDL file to the management roles, parameters and resources of the given network element. Such a configurable mediation device can be dynamically reconfigured to allow a new network element to be substituted in the communication network for the network element for which the mediation device was configured or to reconfigured in accordance with a change in the management-information protocol of an existing network element having to break down the communication network.

The present invention additionally provides various systems for mediating information management in a communications network between one or more network elements respectively having different management-information protocols and one or more operations support systems respectively having different management-information protocols, wherein these various systems comprise one or more mediation devices and a control unit for selectively connecting and/or configuring the mediation device(s) for mediating information management between selected network element (s) and selected operations support system(s), as more precisely described in the detailed description of the preferred embodiments. The control unit can control the configuration of the mediation system and/or the configuration of the mediation devices within the system so that communication between any selected network element and any selected operations support system can be actively carried out without requiring the communication network to be broken down and manually reconfigured.

The present invention further provides various computer readable storage media for use with a processor included in an information-management system for causing and/or enabling the processor to perform various functions, respectively including (i) recognizing different predetermined message patterns within received messages and (ii) recomposing received messages, as more precisely described in the detailed description of the preferred embodiments Additional features of the present invention are also described with reference to the detailed description of the preferred embodiments.

DETAILED DESCRIPTION

Figure 1:
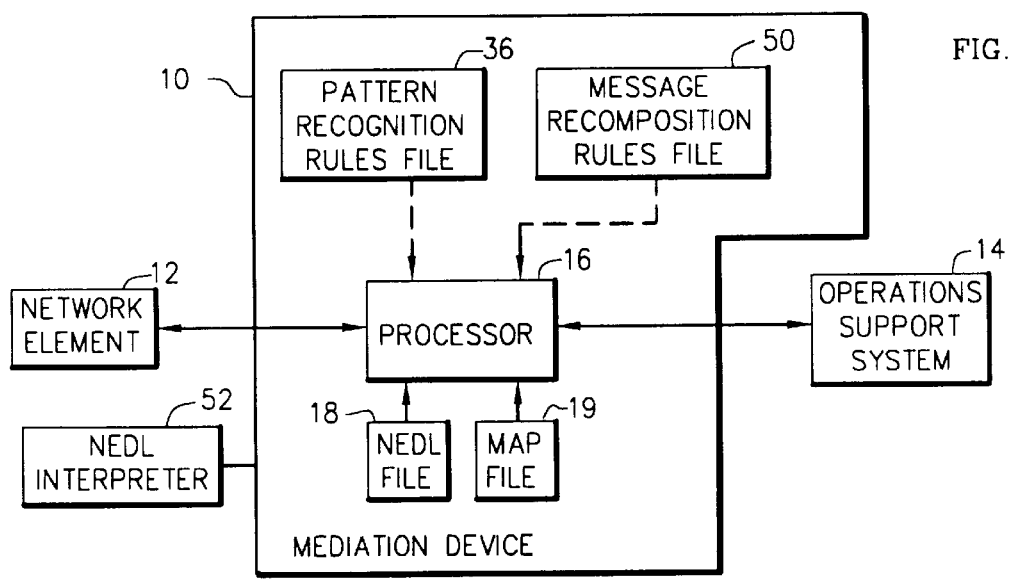
FIG. 1 is a block diagram of a mediation device according to the present invention coupled between a network element and an operations support system for mediating communications between the network element and the operations support system.

Referring to FIG. 1, a preferred embodiment of a mediation device 10 for mediating information management in a communications network for communications between a given network element 12 having a given management-information protocol, such as TL1, and an operations support system 14 having a different management-information protocol, such as CMIP, includes a processor 16, a NEDL file 18 and a map file 19. The mediation device 10 may stand alone or may be implemented by a computer program in a computer, such as a computer running a UNIX operating system, that also embodies the operations support system 14 for the communications network, wherein the processor 16 is embodied in a processor of said computer and the NEDL file 18 is stored in a memory of said computer or in any other storage medium, such as a compact disc, that is accessible by the processor 16. A plurality of NEDL files 18 for use in mediating communications with network elements 12 having different management-information protocols may be stored in the computer memory.

The NEDL file 18 is a reference file that defines a structured network-element-description-language (NEDL) format referencing information-management roles pertaining to the given network element 12 in accordance with the network-element management-information protocol.

The map file 19 maps an association between the operations-support-system protocol and the structured NEDL format and thereby enables the processor 16 to recompose messages in accordance with such mapped association. For use in mediating communications between the network element 12 and an operations support system having a CMIP protocol, the map file 19 maps an association between the NEDL format and the GDMO/ASN.1 resource descriptions and resource attribute descriptions. A plurality of map files 19 for use in mediating communications with operations support systems 14 having different management-information protocols may be stored in the computer memory.

The processor 16 is coupled to the NEDL file 18 and the map file 19 and adapted for recomposing messages received for communication to the network element 12 to be in accordance with the network-element management-information protocol and for recomposing messages received from the network element 12 for communication to the operations support system 14 to be in accordance with the operations-support-system management-information protocol. Communication to and from the network element 12 is provided via a port of the computer that is hosting the mediation device 10.

In an alternative preferred embodiment (not shown), the mapping association provided by the mapping file 19 is provided by the NEDL file 18, the mediation device 16 does not include a separate map file and the processor 16 is coupled to only the NEDL file 18 for performing said message recompositions.

In another alternative preferred embodiment (not shown), the NEDL file 18 is embodied in a file of the operations support system 14 that describes the resources of the operations support system 14, such as a GMDMO file which can be extended to also accommodate the NEDL file 18, whereby the map file 19 is eliminated and the processor 16 is coupled to the both the NEDL file 18 and the GDMO file in the operations support system 14 for performing the message recompositions. In this embodiment the processor 16 is embodied in the operations support system 14 or separately therefrom.

In still another alternative preferred embodiment (not shown), the mapping file 19 is included in the operations support system 14 or in an interface thereto rather than in the mediation device 16.

Figure 2:
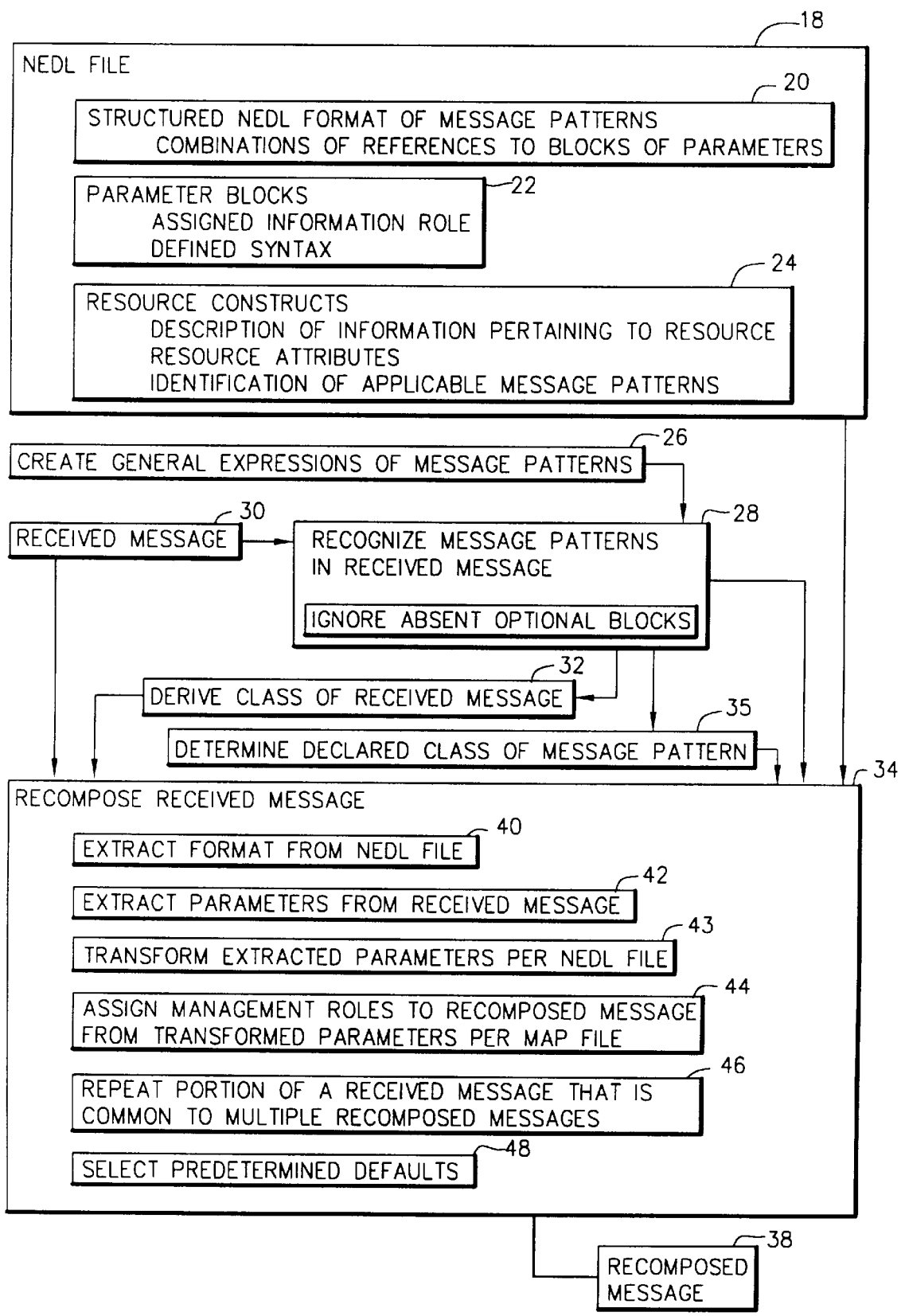
FIG. 2 is a diagram showing the general elements of the NEDL file and further showing message recomposition by the processor in the mediation device of FIG. 1.

Referring to FIG. 2, the structured NEDL format 20 of the NEDL file 18 includes a plurality of different predetermined message patterns respectively containing different combinations of references to blocks of parameters 22 respectively having a defined syntax and an assigned information-management role. The NEDL file also defines the parameter blocks 22. When it desired to reconfigure the mediation device 10 to accommodate a substituted or an altered network element 12, the plurality of different predetermined message patterns are changed accordingly.

An example of a predetermined message pattern of a SET message in accordance with the NEDL format follows:

"RLS-EXT-CONT:<tid>:<aid>:<ctag>::<conttype>;"

The NEDL file 18 contains the following definition of the parameter blocks for this message:

NEID=tid

MESSAGEID=ctag

ATTRIBUTETYPE=conttype

ATTRIBUTEVALUE="RLS"

An example of a predetermined message pattern of an ACTION message in accordance with the NEDL format follows:

"INIT-SYS:<tid>::<ctag>;"

The NEDL file 18 contains the following definition of the parameter blocks for this message:

NEID=tid

MESSAGEID=ctag

The NEDL file 18 further defines the resources of the network element 12 in terms of information managed by the messages, wherein the resources definition includes constructs 24 respectively defining descriptions of the information pertaining to the resource, attributes of the information pertaining to the resource and those of the different message patterns that apply to the resource.

An example of a resource construct 24 follows:

RESOURCE IOC

DESCRIPTION "Input Output Controller"

MESSAGES rmv-eqpt, rst-eqpt, rtrv-alm-eqpt, rtrv-alm-env, rtrv-th-eqpt, rtrv-cnfgm

RESOURCETYPE "IOC"

ATTRIBUTES

BATTFAIL, PWSUPFAIL, HARDFAIL_ALARM, FUSEALARM,

BATTERY1, BATTERY2, PWRSUPPLY1, PWRSUPPLY2,

DC_FAIL, INSR, MAINT_STATE,

ARX1, ARX2, ARX3,

DCARX, FUSE1,

DCARX-HT, FUSE1-HT,

DCARX-LT, FUSE1-LT,

CENRX1, CENRX2, CENRX3, CENRX4,

CENRX5, CENRX6, CENRX7, CENRX8,

CENRX9, CENRX10, CENRX11, CENRX12,

CENRX13, CENRX14, CENRX15, CENRX16,

CENTX1, CENTX2, CENTX3, CENTX4, CENTX5, CENTX6,

CENTX7, CENTX8, CENTX9, CENTX10, CENTX11, CENTX12,

An example of a resource attribute construct follows:

ALARM BATTFAIL

DESCRIPTION "Battery Failure"

ATTRIBUTETYPE "BATTFAIL"

MESSAGES {rept-alm-eqpt, rtrv-alm-eqpt}

For use in mediating communications between the network element 12 and an operations support system having a CMIP protocol, the NEDL file 18 provides resource constructs 24 that enable information managment functions that are generally equivalent to those enabled by the GDMO/ASN.1 resource and resource attribute descriptions.

Referring to FIGS. 1 and 2, the processor 16 is coupled to the NEDL file 18 and adapted for executing a routine 26 of creating general expressions of the different predetermined NEDL-format message patterns 20 in order to enable message-pattern recognition. As an example, for the message:

rept-alm-env having the pattern:
"<tl1_header"
"<almcde> <qtag><tl1_d>"
"REPT ALM ENV<tl1_d>"
";"
the general expression of such message pattern created by the processor 16 pursuant to execution of routine 26 is:

"[\r\n]+([A–Z 0–9]+)([0–9:]+)([0–9-]+)[\r\n]+"

"([A–Z*])([A–Z0–9]+[\r\n]="

"REPT ALM ENV[\r\n]+"

In the foregoing example, the message pattern is generally expressed in a pattern matching language generally described as "regular expressions", which is well known to those skilled in the art of computer science.

The processor 16 is adapted for executing a routine 28 for recognizing the predetermined generally expressed message patterns 26 within messages 30 received from the network element 12 and/or messages 30 received for communication to the network element 12. When a block of a predetermined given message pattern is optional, any absence of the optional block in the received message is ignored during the message recognition routine 28 pursuant to a subroutine 31 so that the given message pattern can still be recognized even though the optional block is not included in the received message 30.

After recognizing the pattern of the received message 30, the processor 16 may then execute a routine 32 of deriving the class of the received message 30 in accordance with the recognized pattern as being within one of a plurality of different predetermined classes, such a GET message, a SET message or an ACTION message and the processor 16 then proceeds to execute a message recomposition routine 34 in accordance with the derived class of the message pattern.

Some of the received messages 30 include a declaration classifying the pattern of the received message 30 as being within one of such plurality of different predetermined classes. Such a declaration of message-pattern class may be explicit and/or such a declaration may be implicit in an information-management operation defined by the received message. The processor 16 is adpated for executing a routine 35 of determining the declared class of the recognized pattern. When the processor determines the declared class of a recognized message pattern in accordance with routine 35, the processor 16 then proceeds with message recomposition in accordance with the declared class of the message pattern.

The processor 16 is adapted for executing the message pattern recognition routine 28, the message class derivation routine 32 and the declared-class-determination routine 35 by a computer program 36 stored in a computer readable storage medium that is embodied in the hardware of the processor 16 and/or in computer software. The storage medium is configured so as to define rules for causing the processor 16 to recognize different generally expressed predetermined message patterns 26 within received messages 30 having a format in accordance with either the network-element management-information protocol or the operations-support-system management-information protocol. These rules cause the processor 16 to recognize a pattern 28 in the received message 30 as a generally expressed predetermined message pattern 26 if the pattern 28 in the received message 30 is encompassed by the generally expressed predetermined message pattern 26 even though the recognized pattern 28 in the received message 30 is not identical to the general expression of the predetermined message pattern 26.

Examples of these rules follow:

I. Letters, number and most punctuation characters match themselves. For example:
  Pattern "a" matches "a".
  Pattern "aB7" matches "aB7".

II. Certain characters have special meaning, such as "*", "+". "?" and "1". For example:
  Pattern "a*" matches "", "a", "aa", "aaa", . . . .
  Pattern "a+" matches "a", "aa", "aaa", . . . .
  Pattern "a?" matches "" or "a".
  Pattern "alb" matches "a" or "b".

III. Complicated patterns can be built by using parentheses to indicate grouping. For example:
  Pattern (alb)* matches any combination of the letters a and b, such as "abbaaabb".

The processor 16 is adapted for executing a routine 34 of recomposing a message 38 from the received message 30 in accordance with the generally expressed message pattern 26 recognized upon execution of the message-pattern-recognition routine 28 and in accordance with the management-information protocol of the network element 12 or the protocol of the operations support system 14, as appropraite. The message recomposition routine 34 includes a number of subroutines.

When the recomposed message 38 is to be sent to the network element 12, the processor 16 executes a routine 40 of extracting the NEDL format of the recomposed message 38 from the NEDL file 18 in accordance with the message class determined by the message class derivation routine 32 or in accordance with the declared-class-determination routine 35.

Examples of NEDL formats for SET, ACTION and GET messages follows:
SET MESSAGE: ris-ext-cont
  PATTERN "RLS-EXT-CONT:<tid>:<aid>:<ctag>::<conttype>;"

ROLES
  NEID=tid
  MESSAGEID=ctag
  ATTRIBUTETYPE=conttype
  ATTRIBUTEVALUE="RLS"
  EXAMPLE OF MESSAGE

"RLS-EXT-CONT:PIRELLINE0001:CONT-2-2-0:OPR001::FAN;"

EXAMPLE OF MESSAGE

"RLS-EXT-CONT:PIRELLINE0001:CONT-01-01-10:AAAAAA-::CENTX1;"

ACTION MESSAGE:rmv-eqpt
PATTERN

"RMV-EQPT:<tid>:<aid>:<ctag>:: ,;"

ROLES
NEID=tid
MESSAGEID=ctag
EXAMPLE OF MESSAGE

"RMV-EQPT:PIRELLINE0001:RALGH-2-0-0:FMV001::,;"

GET MESSAGE:rtrv-ext-cont
PATTERN
"RTRV-EXT-CONT:<tid>:<aid>:<ctag>::<conttype>;"
ROLES
NEID=tid
MESSAGEID=ctag
ATTRIBUTETYPE=conttype
EXAMPLE OF MESSAGE

"RTRV-EXT-CONT:PIRELLINE0001:CONT-1-2-0:CON001::FAN;"

For the foregoing examples, the network element management-information protocol is TL1.

When the received message 30 is received from the network element 12, the processor 16 provides the recomposed message 38 in accordance with the predetermined pattern of the received message 30 recognized upon execution of the pattern recognition routine 28. In addition to autonomous messages, the messages 30 received from the network element 12 include response messages associated with the GET, SET and ACTION request messages sent to the network element 12. Such response messages are recognized through execution of the message pattern recognition routine 26 described above. Examples of response and error messages associated with the examples of the GET, SET and ACTION request messages set forth above follow:

SET MESSAGE: rls-ext-cont
REQUESTED RESPONSE
PATTERN "<tl1_success_header>"
"<tl1_resp_term>"
EXAMPLE
"\r\n PIRELLINE0001 96-01-29 16:36:55"
"\r\nM OPR001 COMPLD"
"\r\n;"
EXAMPLE
"\r\n PIRELLINE0001 95-11-23 12:44:42"
"\r\nM AAAAAA COMPLD"
"\r\n;"
ERROR
PATTERN "<tl1_error_response>"
EXAMPLE
"\r\n PIRELLINE0001 96-01-29 16:36:55"
"\r\nM OPRHDR DENY"
"\r\n ENEQ"
"\r\n /* Not Equipped */"
"\r\n;"
ACTION MESSAGE:rmv-eqpt
REQUESTED RESPONSE
PATTERN "<tl1_success_response>"
EXAMPLE
"\r\n PIRELLINE0001 96-01-30 16:36:55"
"\r\nM RMV001 COMPLD"
"\r\n;"
ERROR
PATTERN "<tl1_error_response>"
EXAMPLE
"\r\n PIRELLINE0001 96-01-29 16:36:55"
"\r\nM RMV001 DENY"
"\r\n IDNV"
"\r\n /* Input, Data Not valid */"
"\r\n;"
GET MESSAGE: rtrv-ext-cont
REQUESTED RESPONSE
PATTERN "<tl1_success_header>"
"<rtrv-ext-cont-repeating-row>"
"<tl1_resp_term>"
EXAMPLE
"\r\n PIRELLINE0001 96-01-29 16:36:55"
"\r\nM CON001 COMPLD"
"\r\n \"CONT-1-2-0:FAN,CONTS,OPER\""
"\r\n;"
ERROR
PATTERN "<tl1_error_response>"
EXAMPLE
"\r\n PIRELLINE0001 96-01-29 16:36:55"
"\r\nM RTVHDR DENY"
"\r\n IISP"
"\r\n /* Input, Invalid Access Identifier */"
"\5\n;"

The processor 16 executes equivalent message recomposition subroutines 42, 43, 44, 46, 48 without regard as to whether the recomposed message 38 is to be sent to the network element 12 or the received message 30 was received from the network element 12.

The processor 16 is adapted for executing a subroutine 42 of extracting parameters from the received message 30; a subroutine 43 of transforming the extracted parameters pursuant to the NEDL file 18 to be in accordance with the protocol of the recomposed message 38; and a subroutine 44 of assigning management roles to the recomposed message 38 from the transformed parameters in accordance with the file map 19.

The processor 16 is adapted for executing a subroutine 46 of extracting from the received message 30 and including in the recomposed message 38 a common parameter referenced by the recognized message pattern 28 in a received message 30 when such received message 30 indicates that such extracted parameter is to be repeated in such recomposed message 38 among a specified plurality of recomposed messages 38. Accordingly, the processor 16 is adapted for recomposing a plurality of different messages 38 respectively repeating a common portion of the received message 30.

The processor 16 is adapted for executing a subroutine 48 of using predetermined defaults for completing the recomposed message 38, such as when the received message 30 did not include a block that was optional with regard to recongnition of the recieved message.

The processor 16 is adapted for executing the message recomposition routine 34, including the above-described subroutines 40, 42, 43, 44, 46 and 48 by a computer program 50 stored in a computer readable storage medium that is embodied in the hardware of the processor 16 and/or in computer software. The storage medium is configured so as to define rules for causing the processor 16 to recompose messages by executing the recomposition routine 34, including the above-described subroutines 40, 42, 43, 44, 46 and 48.

Referring again to FIG. 1, a NEDL interpreter 52 is coupled to the NEDL file 18 for interpreting text-based definitions of the structured NEDL format for entry into the NEDL file 18 so that the mediation device 10 may be configured or reconfigurerd for a given network element 12 by adapting the NEDL file 18 to the management roles, parameters and resources of the given network element 12. The mediation device 10 can also be reconfigured by accessing a different NEDL file 18 from the memory of the computer embodying the mediation device 10. Accordingly the mediation device 10 can be reconfigured dynamically in accordance with management-information protocol changes in the communication network and/or the network elements 12.

Figure 3:
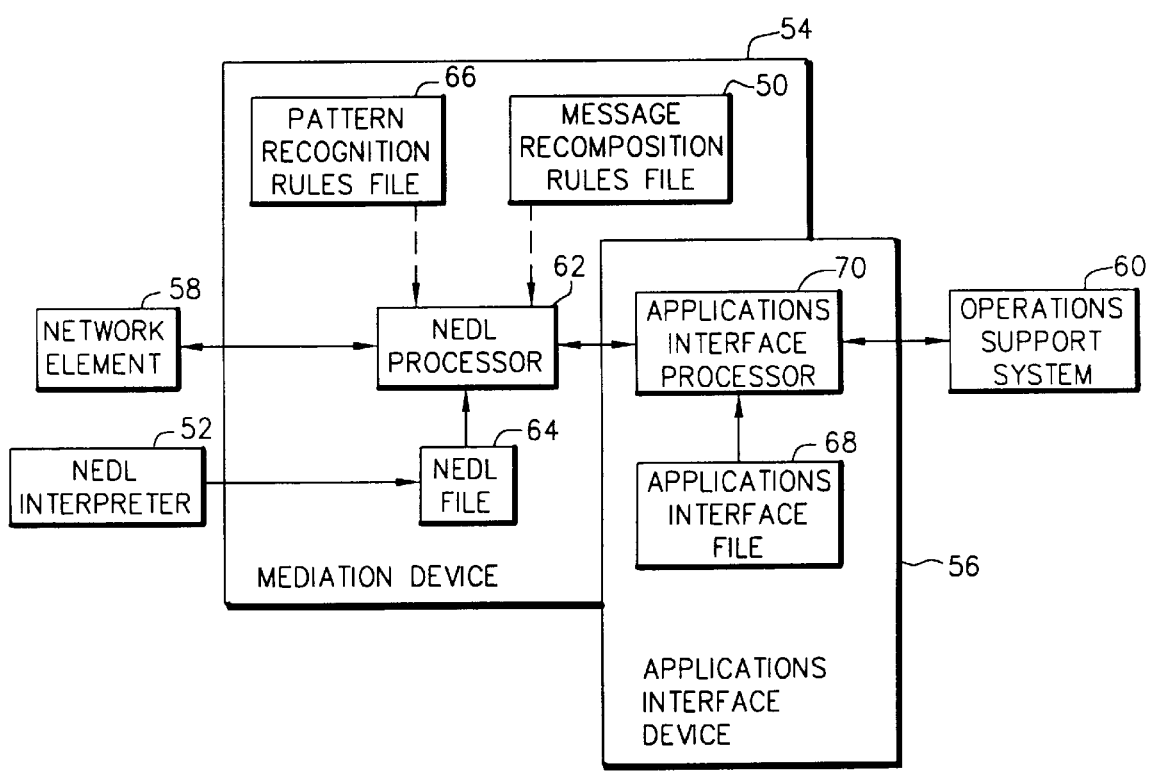
FIG. 3 is a block diagram of an alternative preferred embodiment of the mediation device of the present invention in combination with an application interface device for mediating communications between the network element and the operations support system.

In an alternative preferred embodiment of the present invention, as shown in FIG. 3, a mediation device 54 is combined with an application interface unit 56 for mediating information management in a communications network for communications between a given network element 58 and an operations support system 60. The mediation device 54 includes a NEDL processor 62 and a NEDL file 64.

The mediation device 54 is adapted for mediating information management for communications between the network element 58, which has a given management-information protocol, and the application interface unit 56, which has an intermediate management-information protocol that is different from the network-element management-information protocol.

The NEDL file 64 defines a structured network-element-description-language (NEDL) format referencing information-management roles pertaining to the given network element 58 in accordance with the network-element management-information protocol and in accordance with the intermediate management-information protocol. The NEDL processor 62 is coupled to the NEDL file 64 and adapted for recomposing messages received for communication to the network element 58 to be in accordance with the network-element management-information protocol and for recomposing messages received from the network element 58 for communication to the application interface device 56 to be in accordance with the intermediate management-information protocol.

A NEDL interpreter 52 is coupled to the NEDL file 64 for interpreting text-based definitions of the structured NEDL format for entry into the NEDL file 64 so that the mediation device 54 may be configured for a given network element 58 by adapting the NEDL file 64 to the management roles, parameters and resources of the given network element 58.

The application interface device 56 is adapted for mediating information management for communications between the NEDL processor 62 and the operations support system 60, which has an management-information protocol that is different from the network-element management-information protocol and the intermediate management-information protocol. The application interface device 56 includes an application-interface file 68 and an application-interface processor 70. The application-interface file 68 maps the relationship between the operations-support-system protocol and the intermediate management-information protocol. The application-interface processor 70 is coupled to the application-interface file 68 and to the NEDL processor 62 for recomposing messages received from the NEDL processor 62 for communication to the operations support system 60 to be in accordance with the operations-support-system management-information protocol and for recomposing messages received from the operations support system 60 for communication to the NEDL processor 62 to be in accordance with the intermediate management-information protocol.

Except as described above and in the following two paragraphs, the mediation device 54 is embodied and functions in the same manner as the mediation device 10, as described above with reference to FIGS. 1 and 2.

The NEDL processor 62 is adapted for executing the message pattern recognition routine 28 by a computer program 66 stored in a computer readable storage medium that is embodied in the hardware of the NEDL processor 62 and/or in computer software. The storage medium is configured so as to define rules for causing the NEDL processor 62 to recognize different generally expressed predetermined message patterns 26 within received messages 30 having a format in accordance with either the network-element management-information protocol or the intermediate management-information protocol.

The mediation device 54 does not include a separate file map for enabling message recomposition from the NEDL format to the management-information protocol of the operations support system 60. The NEDL processor 62 is adapted for executing a subroutine 44 of assigning management roles to the recomposed message 38 from the transformed parameters in accordance with the NEDL file 64.

Figure 4:
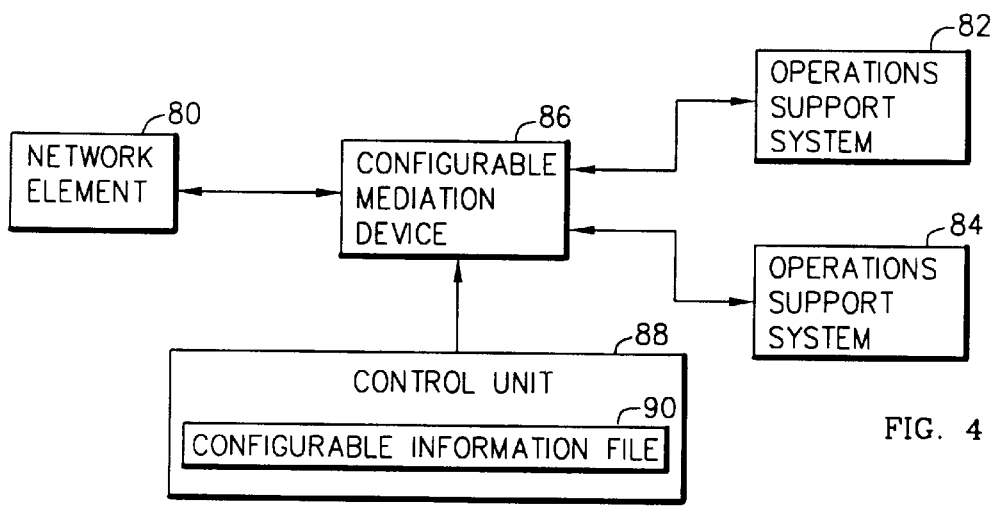
FIG. 4 is a block diagram of a configurable system according to the present invention for mediating information management in a communications network.

Referring to FIG. 4 a preferred embodiment of a configurable system for mediating information management in a communications network between a network element 80 having a given management-information protocol and a first operations support system 82 and/or a second operations support system 84 respectively having different management-information protocols that are different that the given network-element management-information protocol, includes a configurable mediation device 86 and a control unit 88.

The configurable mediation device 86 is adapted for recomposing messages received for communication to the network element 80 to be in accordance with the network-element management-information protocol, for recomposing messages received from the network element 80 for communication to the first operations support system 82 to be in accordance with the first operations-support-system management-information protocol and for recomposing messages received from the network element 80 for communication to the second operations support system 84 to be in accordance with the second operations-support-system management-information protocol. The configurable mediation device 86 is software modifiable for forming a plurality of different configurations and may be configured directly under control of the control unit 88.

The control unit 88 is adapted for selectively causing the mediation device 86 to be configured for recomposing messages received from the network element 80 for communication to the first operations support system 82 to be in accordance with the first operations-support-system management-information protocol and/or to be configured for recomposing messages received from the network element 80 for communication to the second operations support system 84 to be in accordance with the second operations-support-system management-information protocol. The control unit 88 includes a configuration information file 90 for defining the configuration of the mediation device 86. The control unit 88 may be a general purpose computer operating under the control of the computer operating system for the communications network; and the configuration information file 90 may be stored in a memory of said computer.

Figure 5:
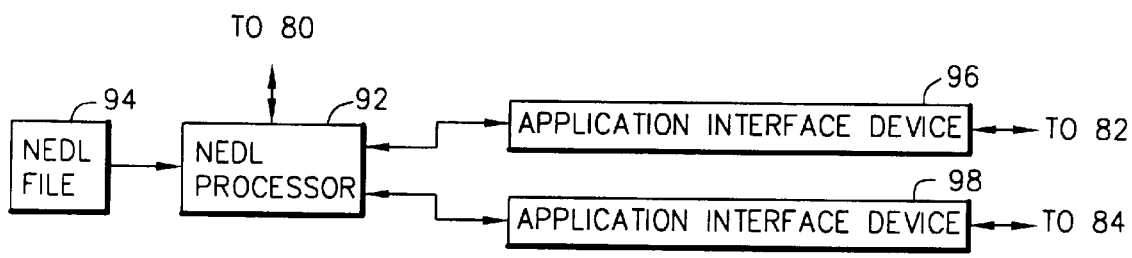
FIG. 5 is a block diagram of a preferred embodiment of a configurable mediation device included in the system of FIG. 4.

Referring to FIG. 5, a preferred embodiment of the configurable mediation device 86 includes a NEDL processor 92, a NEDL file 94, a first application interface device 96 and a second application interface device 98.

The NEDL file 94 defines a structured network-element-description-language (NEDL) format referencing information-management roles pertaining to the given network element 80 in accordance with the network-element management-information protocol and in accordance with an intermediate management-information protocol that is different from the network-element management-information protocol and the first and second operations-support-system management-information protocols; and the NEDL processor 92 is coupled to the NEDL file 94 for recomposing messages received for communication to the network element 80 to be in accordance with the network-element management-information protocol and for recomposing messages received from the network element 80 for communication to the first and second application interface devices 96, 98 to be in accordance with the intermediate management-information protocol. Preferably, the NEDL processor 92 is embodied as described above with reference to FIG. 3.

The first application interface device 96 is adapted for mediating information management for communications between the NEDL processor 92 and the first operations support system 82; and the second application interface device 98 is adapted for mediating information management for communications between the NEDL processor 92 and the second operations support system 84. The first and second application interface devices 96, 98 may be embodied as described above with reference to FIG. 3.

In accordance with the content of configuration information file 90, the control device 88 configures the mediation unit 86 to effect communications between the network element 80 and either or both of the first and second operations support systems 82, 84 by selectively enabling or disabling communications between the mediation device 86 and the first and second operations support systems 82, 84 respectively, or, when the mediation device 86 is embodied as shown in FIG. 5, by selectively enabling or disabling communications between the NEDL processor 92 and the first and second application interface devices 96, 98 respectively.

Figure 6:
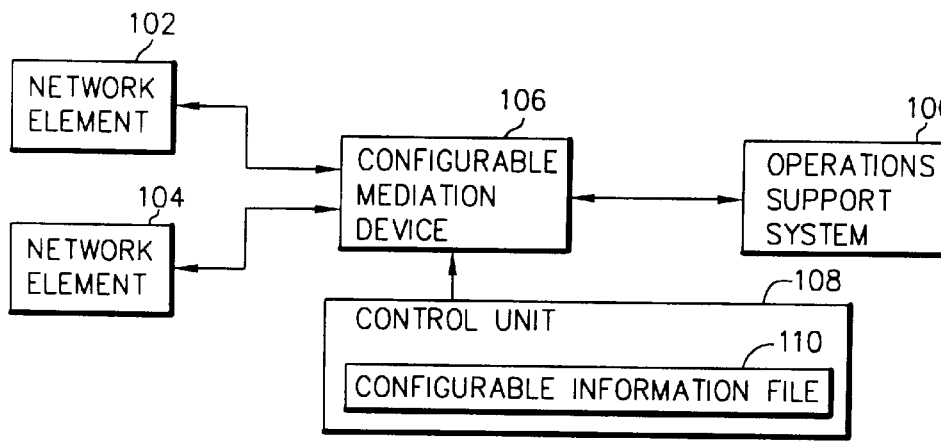
FIG. 6 is a block diagram of another configurable system according to the present invention for mediating information management in a communications network.

Referring to FIG. 6, a preferred embodiment of a configurable system for mediating information management in a communications network between an operations support system 100 having a given management-information protocol and a first network element 102 and/or a second network element 104 respectively having different management-information protocols that are different from the operations-support-system management-information protocol includes a configurable mediation device 106 and a control unit 108.

The configurable mediation device 106 is adapted for recomposing messages received for communication to the first network element 102 to be in accordance with the first network-element management-information protocol, for recomposing messages received for communication to the second network element 104 to be in accordance with the second network-element management-information protocol, for recomposing messages received from the first network element 102 for communication to the operations support system 100 to be in accordance with the operations-support-system management-information protocol and for recomposing messages received from the second network element 104 for communication to the operations support system to be in accordance with the operations-support-system management-information protocol. The configurable mediation device 106 is software modifiable for forming a plurality of different configurations and may be configured directly under control of the control unit 108.

The control unit 108 is adapted for selectively causing the mediation device 106 to be configured for recomposing messages received for communication to the first network element 102 to be in accordance with the first network-element management-information protocol and for recomposing messages received from the first network element 102 for communication to the operations support system 100 to be in accordance with the operations-support-system management-information protocol and/or to be configured for recomposing messages received for communication to the second network element 104 to be in accordance with the second network-element management-information protocol and for recomposing messages received from the second network element 104 for communication to the operations support system 100 to be in accordance with the operations-support-system management-information protocol. The control unit 108 includes a configuration information file 110 for defining the configuration of the mediation device 106. The control unit 108 may be a general purpose computer operating under the control of the computer operating system for the communications network; and the configuration information file 110 may be stored in a memory of said computer.

Figure 7:
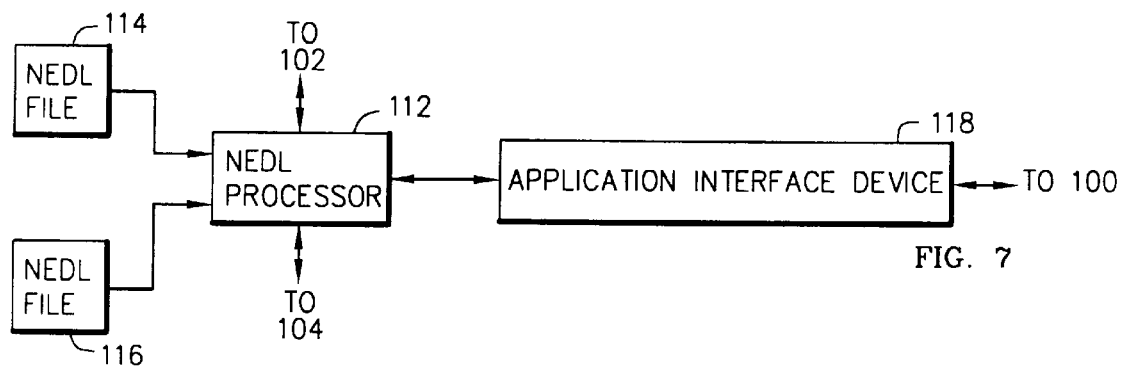
FIG. 7 is a block diagram of one preferred embodiment of a configurable mediation device included in the system of FIG. 6.

Referring to FIG. 7, one preferred embodiment of the configurable mediation device 106 includes a NEDL processor 112, a first NEDL file 114, a second NEDL file 116 and an application interface device 118.

The first NEDL file 114 defines a structured network-element-description-language (NEDL) format referencing information-management roles pertaining to the first network element 102 in accordance with the first network-element management-information protocol and in accordance with an intermediate management-information protocol that is different from the first and second network-element management-information protocols and the operations-support-system management-information protocol; and the second NEDL file 116 defines a structured NEDL format referencing information-management roles pertaining to the second network element 104 in accordance with the second network-element management-information protocol and in accordance with the intermediate management-information protocol.

The NEDL processor 112 is coupled to the first NEDL file 114 for recomposing messages received for communication to the first network element 102 to be in accordance with the first network-element management-information protocol and for recomposing messages received from the first network element 102 for communication to the application interface device 118 to be in accordance with the intermediate management-information protocol. The NEDL processor 112 also is coupled to the second NEDL file 116 for recomposing messages received for communication to the second network element 104 to be in accordance with the second network-element management-information protocol and for recomposing messages received from the second network element 104 for communication to the application interface device 118 to be in accordance with the intermediate management-information protocol. Preferably, the NEDL processor 112 is embodied as described above with reference to FIG. 3.

The NEDL processor 112 is adapted for accessing multiple NEDL files 114, 116 simultaneously for recomposing messages for different destinations simultaneously. The name of the NEDL file 114, 116 used for mediating communications with a given operations support system 100 must be specified network element in the messages received by the mediation NEDL processor 112. The NEDL processor 112 can be adapted to allow multiple mediation functions to be performed in parallel by using the UNIX'fork()' system call before accessing the NEDL file 114, 116. The UNIX'fork()' system allows multiple copies of the same program to be run on the same UNIX system so that the NEDL processor 112 can effectively function like multiple mediation devices running one protocol each.

The application interface device 118 is adapted for mediating information management for communications between the NEDL processor 112 and the operations support system 100. The application interface device 118 may be embodied as described above with reference to FIGS. 3 or 4.

Figure 8:
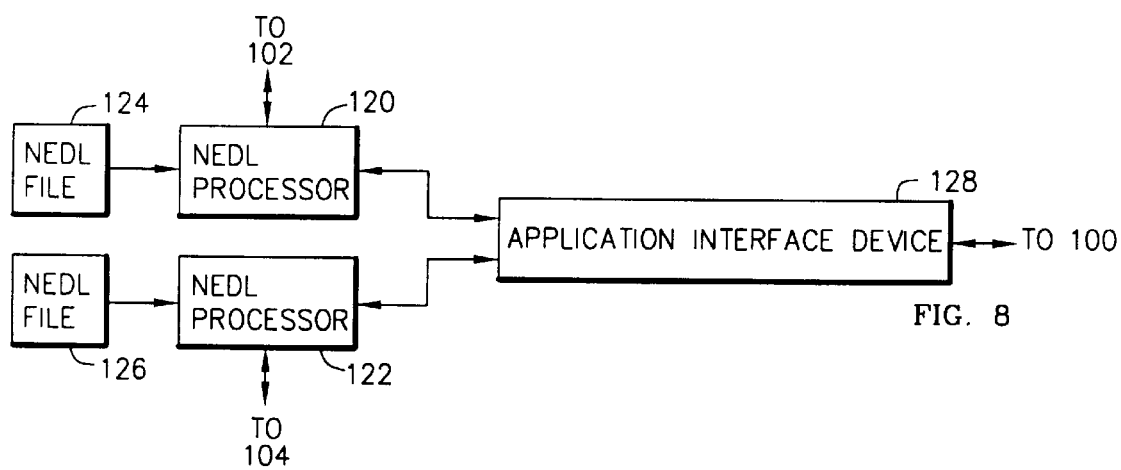
FIG. 8 is a block diagram of another preferred embodiment of a configurable mediation device included in the system of FIG. 6.

Referring to FIG. 8, another preferred embodiment of the configurable mediation device 106 includes a first NEDL processor 120, a second NEDL processor 122, a first NEDL file 124, a second NEDL file 126 and an application interface device 128.

The first NEDL file 124 defines a structured network-element-description-language (NEDL) format referencing information-management roles pertaining to the first network element 102 in accordance with the first network-element management-information protocol and in accordance with an intermediate management-information protocol that is different from the first and second network-element management-information protocols and the operations-support-system management-information protocol; and the second NEDL file 126 defines a structured NEDL format referencing information-management roles pertaining to the second network element 104 in accordance with the second network-element management-information protocol and in accordance with the intermediate management-information protocol.

The first NEDL processor 120 is coupled to the first NEDL file 124 for recomposing messages received for communication to the first network element 102 to be in accordance with the first network-element management-information protocol and for recomposing messages received from the first network element 102 for communication to the application interface device 128 to be in accordance with the intermediate management-information protocol. The second NEDL processor 122 is coupled to the second NEDL file 126 for recomposing messages received for communication to the second network element 104 to be in accordance with the second network-element management-information protocol and for recomposing messages received from the second network element 104 for communication to the application interface device 128 to be in accordance with the intermediate management-information protocol. Preferably, the first NEDL processor 120 and the second NEDL processor 122 are embodied as described above with reference to FIG. 3.

The application interface device 128 is adapted for mediating information management for communications between the first NEDL processor 120 and/or the second NEDL processor 122 and the operations support system 100. The application interface device 128 may be embodied as described above with reference to FIGS. 3 or 4.

In accordance with the content of configuration information file 110, the control unit 108 configures the mediation unit 106 to effect communications between the operations support system 100 and either or both of the first and second network elements 102, 104 by selectively enabling or disabling communications between the mediation unit 106 and the first and second network elements 102, 104 respectively, or, when the mediation device 106 is embodied as shown in FIG. 7, by selectively enabling or disabling communications between the NEDL processor 112 and the first and second NEDL files 114, 116 respectively, or, when the mediation device 106 is embodied as shown in FIG. 8, by selectively enabling or disabling communications between the first NEDL processor 120 and either the first NEDL file 114 or the application interface device 128 and/or between the second NEDL processor 122 and either the second NEDL file 116 or the application interface device 128 respectively.

Figure 9:
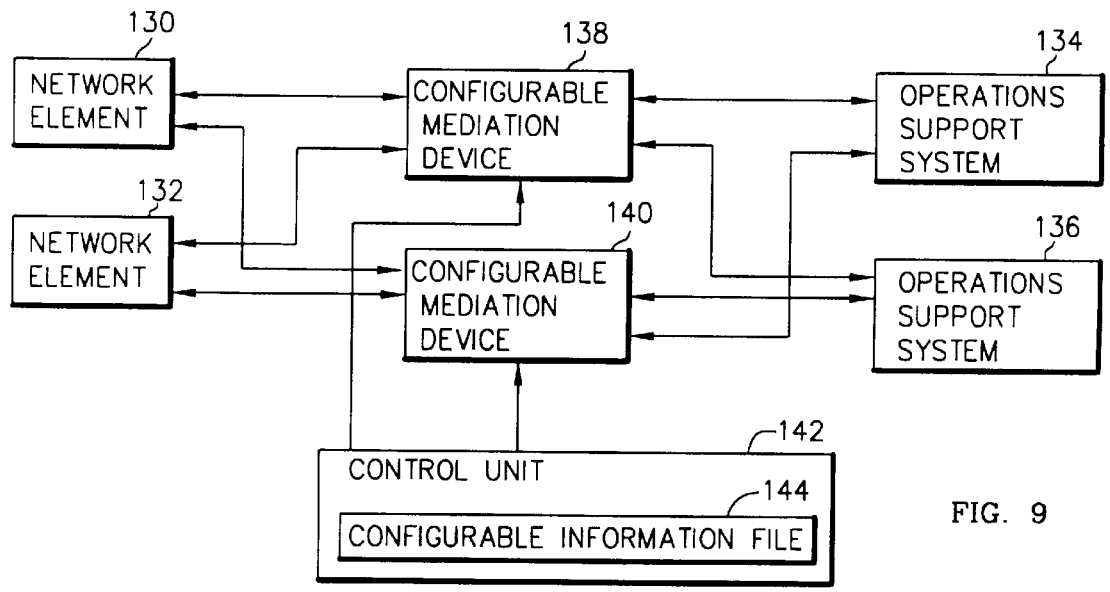
FIG. 9 is a block diagram of still another configurable system according to the present invention for mediating information management in a communications network.

Referring to FIG. 9, a preferred embodiment of a configurable system for mediating information management in a communications network between a plurality of network elements 130, 132 respectively having different management-information protocols and a plurality of operations support systems 134, 136 respectively having different management-information protocols that are different from the network-element management-information protocols includes a plurality of configurable mediation devices 138, 140 and a control unit 142.

Each of the mediation devices 138, 140 is adapted for recomposing messages received for communication to the respective network elements 130, 132 to be in accordance with the network-element management-information protocol of the respective network element 130, 132 and for recomposing messages received from the respective network elements 130, 132 for communication to the respective operations support systems 134, 136 to be in accordance with the operations-support-system management-information protocol for the respective operations support system 134, 136. Each of the configurable mediation devices 138, 140 may be connected to one or more of the network elements 130, 132. The configurable mediation devices 138, 140 are software modifiable for forming a plurality of different configurations and may be configured directly under control of the control unit 142.

The control unit 142 is coupled to the mediation devices 138, 140 for causing the mediation devices 138, 140 to be configured for communication between different combinations of selected network elements 130, 132 and selected operations support systems 134, 136 by selectively causing the respective mediation devices to be configured for recomposing messages received for communication to the selected network element to be in accordance with the network-element management-information protocol for the selected network element and to be configured for recomposing messages received from the selected network element for communication to the selected operations support system to be in accordance with the operations-support-system management-information protocol for the selected operations support system. The control unit 142 includes a configuration information file 144 for defining the configuration of the mediation devices 138, 140. The control unit 142 may be a general purpose computer operating under the control of the computer operating system for the communications network; and the configuration information file 144 may be stored in a memory of said computer.

Figure 10:
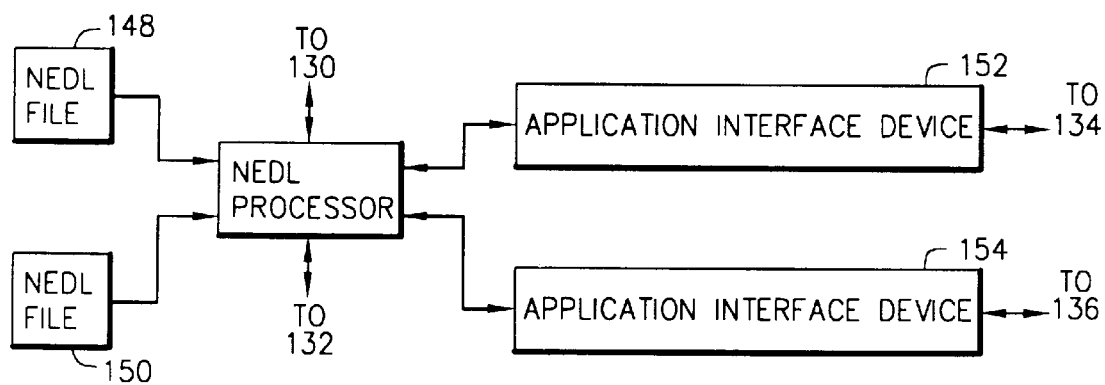
FIG. 10 is a block diagram of a preferred embodiment of a configurable mediation device included in the system of FIG. 9.

Referring to FIG. 10, a preferred embodiment of the configurable mediation devices 138, 140 includes a NEDL processor 146, a first NEDL file 148, a second NEDL file 150 and a first application interface device 152 and a second application interface device 154. The NEDL processor 146 and the first and second NEDL files 148, 150 are coupled together and function in the same manner as described above with reference to FIG. 7.

The first application interface device 152 is adapted for mediating information management for communications between the NEDL processor 146 and one operations support system 134 and the second application interface device 154 is adapted for mediating information management for communications between the NEDL processor 146 and another operations support system 136. Each application interface device 152, 154 may be embodied as described above with reference to FIGS. 3 or 4.

In a preferred embodiment (not shown) of the configuration devices 138, 140 of FIG. 9 alternative to the embodiment shown in FIG. 10, a separate NEDL processor 146 is coupled to each NEDL file 148, 150 and is coupled to each of the application interface devices 152, 154.

Although the system of FIG. 9 is shown for use with two network elements 130, 132 and two operations support systems 134, 136, the system of FIG. 9 may be adapted for use with any number of network elements and any number of operations support systems by including an appropriate number of mediation devices 138, 140.

In accordance with the content of configuration information file 144, the control devices 142 configures the mediation units 138, 149 to effect communications between different combinations of selected network elements 130, 132 and selected operations support systems 134, 136 by selectively enabling or disabling communications between the mediation devices 138, 140 and selected network elements 130, 132 respectively, by selectively enabling or disabling communications between the mediation devices 138, 140 and selected operations support systems 134, 136 respectively, or, when the mediation device 138 is embodied as shown in FIG. 10, by selectively enabling or disabling communications between the NEDL processor 146 and the first and second NEDL files 148, 150 respectively, or by selectively enabling or disabling communications between the NEDL processor 146 and the first and second application interface devices 152, 154 respectively.

Figure 11:
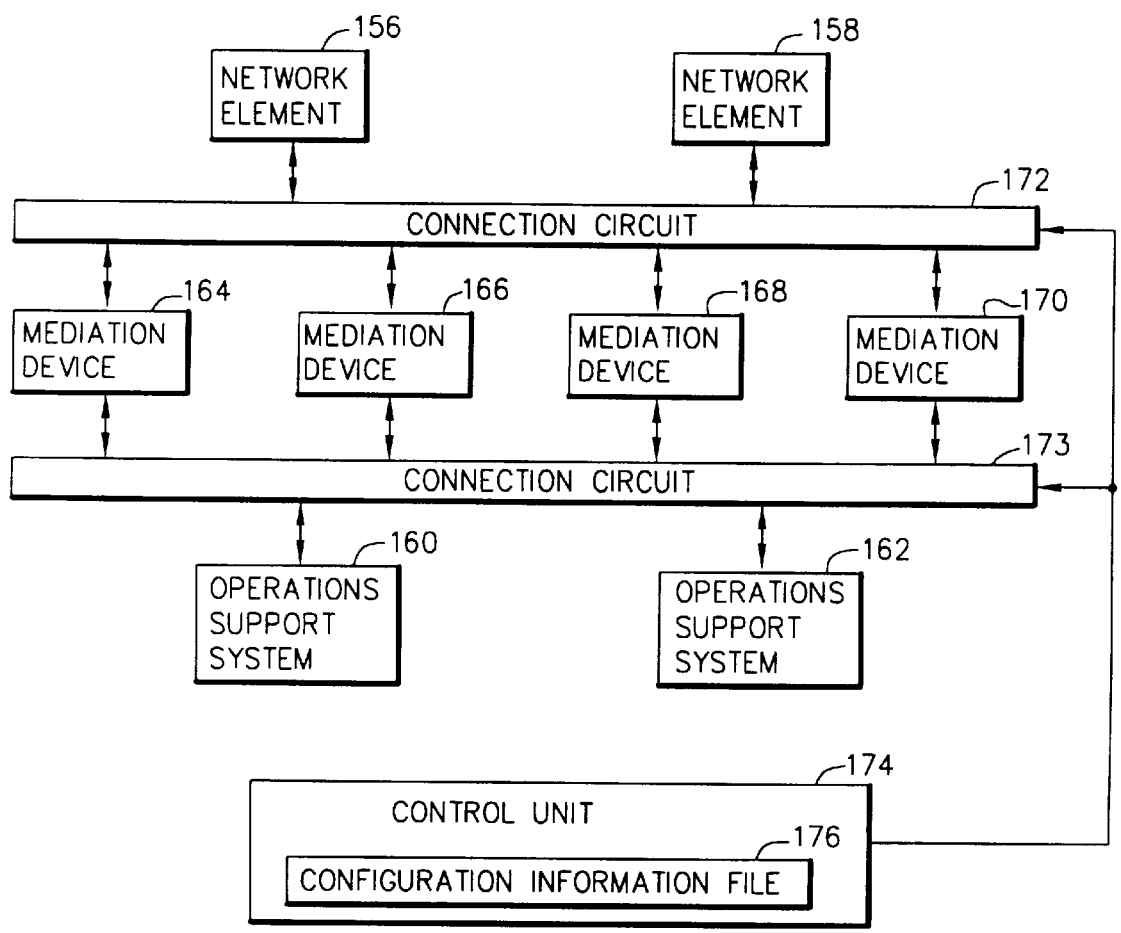
FIG. 11 is a block diagram of yet another configurable system according to the present invention for mediating information management in a communications network.

Referring to FIG. 11, a preferred embodiment of a configurable system for mediating information management in a communications network between a first network element 156 and/or a second network element 158 respectively having different management-information protocols and a first operations support system 160 and/or a second operations support system 162 respectively having different first and second management-information protocols that are different from the network-element management-information protocols includes a first mediation device 164, a second mediation device 166, a third mediation device 168, a fourth mediation device 170, connection circuits 172, 173 and a control unit 174.

Each mediation device 164, 166, 168, 170 is specifically adapted for mediating communications between one type of network element 156, 158 and one type of operations support system 160, 162. The first mediation device 164 is adapted for recomposing messages received for communication to the first network element 156 to be in accordance with the first network-element management-information protocol and for recomposing messages received from the first network element 156 for communication to the first operations support system 160 to be in accordance with the first operations-support-system management-information protocol. The second mediation device 166 is adapted for recomposing messages received for communication to the first network element 156 to be in accordance with the first network-element management-information protocol and for recomposing messages received from the first network element 156 for communication to the second operations support system 162 to be in accordance with the second operations-support-system management-information protocol. The third mediation device 168 is adapted for recomposing messages received for communication to the second network element 158 to be in accordance with the second network-element management-information protocol and for recomposing messages received from the second network element 158 for communication to the first operations support system 160 to be in accordance with the first operations-support-system management-information protocol. The fourth mediation device 170 is adapted for recomposing messages received for communication to the second network element 158 to be in accordance with the second network-element management-information protocol and for recomposing messages received from the second network element 158 for communication to the second operations support system 162 to be in accordance with the second operations-support-system management-information protocol.

The connection circuits 172, 173 are adapted for selectively connecting the first mediation device 164 between the first network element 156 and the first operations support system 160, connecting the second mediation device 166 between the first network element 156 and the second operations support system 162, connecting the third mediation device 168 between the second network element 158 and the first operations support system 160, and/or connecting the fourth mediation device 170 between the second network element 158 and the second operations support system 162. The connection circuits 172, 173 may include a cross-point switch in a telephone system, a routing module in a communication system, a TCP/IP (Internet) connection or any other means for connecting a mediation device 164, 166, 168, 170 with a network element 156, 158 or an operations support system 160, 162.

The control unit 174 is coupled to the connection circuits 172, 173 for selectively causing the connection circuits 172, 173 to connect the first mediation device 164 between the first network element 156 and the first operations support system 160, to connect the second mediation device 166 between the first network element 156 and the second operations support system 162, to connect the third mediation device 168 between the second network element 158 and the first operations support system 160, and/or to connect the fourth mediation device 170 between the second network element 158 and the second operations support system 162. The control unit 174 includes a configuration information file 176 for defining the selective connections effected by the connection circuits 172, 173. The control unit 174 may be a general purpose computer operating under the control of the computer operating system for the communications network; and the configuration information file 176 may be stored in a memory of said computer.

Preferred embodiments of the respective mediation devices 164, 166, 168, 170 may include a mediation device 10, as described with reference to FIG. 1, or a combination of a NEDL processor 62, a NEDL file 64 and an application interface device 56 as described with reference to FIG. 3.

In alternative preferred embodiments, the mediation devices of the present invention described with reference to FIGS. 1–3 are adapted for mediating communications between devices other than network elements and operations support systems. In one such set of alternative embodiments, the mediation devices of FIGS. 1–3 are adapted for mediating communications between a computer having one protocol, such as UNIX, and a computer input device having a different protocol, such as DOS, wherein the reference file defining a structured format referencing information-management roles references the information-management roles pertaining to the computer in accordance with the protocol of the computer; and the processor is coupled to the reference file and adapted for recomposing messages received for communication to the computer to be in accordance with the protocol of the computer and for recomposing messages received from the computer for communication to the computer input device to be in accordance with the protocol of the computer input device or to be in accordance with an intermediate protocol.

In alternative preferred embodiments, the systems of the present invention described with reference to FIGS. 4–11 are adapted for mediating communications between devices other than network elements and operations support systems. In one such set of alternative embodiments, the systems of FIGS. 4–11 are adapted for mediating communications between computers having different protocols, such as DOS and UNIX.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

What is claimed is:

1. A device for mediating information management in a communications network between a network element having a given management-information protocol and an operations support system having a different management-information protocol, comprising
    a NEDL file defining a structured network-element-description-language NEDL format referencing information-management roles pertaining to the given network element in accordance with the network-element management-information protocol; and
    a processor coupled to the NEDL file and adapted for recomposing messages received for communication to the network element to be in accordance with the network-element management-information protocol and for recomposing messages received from the network element for communication to the operations support system to be in accordance with the operations-support-system management-information protocol.

2. A device according to claim 1, further comprising a map file mapping an association between the operations-support-system protocol and the structured NEDL format and coupled to the processor for enabling the processor to recompose messages in accordance with such mapped association.

3. A device according to claim 1, wherein the structured format includes a plurality of different predetermined message patterns respectively containing different combinations of references to blocks of parameters respectively having an assigned information-management role.

4. A device according to claim 3, wherein the processor is adapted for recognizing said predetermined message patterns within messages received from the network element and/or messages received for communication to the network element.

5. A device according to claim 4, wherein the processor is coupled to the NEDL file and adapted for creating general expressions of the different predetermined message patterns in order to enable said message-pattern recognition.

6. A device according to claim 4, wherein the processor is adapted for ignoring the absence of optional blocks of parameters in said received message when recognizing said predetermined message patterns.

7. A device according to claim 6, wherein the processor is adapted for using predetermined defaults for said absent optional blocks when recomposing said message.

8. A device according to claim 4, wherein the processor is adapted for deriving the class of the received message in accordance with the recognized recognized message pattern as being within one of a plurality of different predetermined classes and for executing said message recomposition in accordance with the derived class of the message pattern.

9. A device according to claim 8 for use when the received message includes a declaration classifying the pattern of the received message as being within one of said plurality of different predetermined classes,
    wherein the processor is adapted for determining the declared class of said recognized message pattern and for executing said message recomposition in accordance with the declared class of the message pattern notwithstanding the derived class of the message pattern.

10. A device according to claim 4, wherein the processor is adapted for executing said message recompositions in accordance with said recognized patterns.

11. A device according to claim 10, wherein said parameter blocks respectively have a defined syntax; and
    wherein the processor is adapted for extracting from the received message for use in said message recomposition the parameters referenced by the predetermined message pattern recognized by the processor.

12. A device according to claim 4, wherein the processor is adapted for recomposing a plurality of different messages respectively repeating a common portion of said received message.

13. A device according to claim 3, wherein the NEDL file also defines resources of the network element in terms of information managed by said messages.

14. A device according to claim 13, wherein said resources definition includes constructs respectively defining descriptions of information pertaining to the resources, attributes of the information pertaining to the resources and those of said different message patterns that apply to the resources.

15. A device according to claim 14, wherein the processor is adapted for recognizing said predetermined message patterns within messages received from the network element and/or messages received for communication to the network element, and is adapted for executing said message recomposition in accordance with the recognized predetermined message pattern and in accordance with said resource constructs.

16. A device for mediating information management in a communications network for communications with a given network element having a given management-information protocol, comprising
    a NEDL file defining a structured network-element-description-language NEDL format referencing information-management roles pertaining to the given network element in accordance with said network-element management-information protocol and in accordance with an intermediate management-information protocol that is different from said network-element management-information protocol; and
    a NEDL processor coupled to the NEDL file and adapted for recomposing messages received for communication to the network element to be in accordance with said network-element management-information protocol and for recomposing messages received from the network element for further communication to be in accordance with said intermediate management-information protocol.

17. A device according to claim 16, in combination with an application interface device for mediating information management in said communications network between the network element and an operations support system having a management-information protocol that is different from said network-element management-information protocol and said intermediate management-information protocol, wherein the application interface device is adapted for mediating information management for communications between the NEDL processor and said operations support system.

18. A combination according to claim 17, wherein the application interface device comprises an application-interface file mapping a relationship between the operations-support-system protocol and the intermediate management-information protocol; and an application-interface processor coupled to the application-interface file and to the NEDL processor for recomposing messages received from the NEDL processor for communication to the operations support system to be in accordance with said operations-support-system management-information protocol and for recomposing messages received from the operations support system for communication to the NEDL processor to be in accordance with the intermediate management-information protocol.

19. A device according to claim 16, wherein said network-element-description-language format includes a plurality of different predetermined message patterns respectively containing different combinations of references to blocks of parameters respectively having a defined syntax and an assigned information-management role.

20. A device according to claim 19, wherein the processor is adapted for recognizing said predetermined message patterns within messages received from the network element and/or messages received for communication to the network element.

21. A device according to claim 20, wherein the processor is coupled to the NEDL file for creating general expressions of the different predetermined NEDL-format message patterns in order to enable said message-pattern recognition.

22. A device according to claim 20, wherein the processor is adapted for ignoring the absence of optional blocks of parameters in said received message when recognizing said predetermined message patterns.

23. A device according to claim 22, wherein the processor is adapted for using predetermined defaults for said absent optional blocks when recomposing said message.

24. A device according to claim 20, wherein the processor is adapted for deriving the class of the received message in accordance with the recognized message pattern as being within one of a plurality of different predetermined classes and for executing said message recomposition in accordance with the derived class of the recognized message pattern.

25. A device according to claim 24 for use when the received message includes a declaration classifying the pattern of the received message as being within one of said plurality of different predetermined classes, wherein the processor is adapted for determining the declared class of said recognized message pattern and for executing said message recomposition in accordance with the declared class of the message pattern notwithstanding the derived class of the recognized message pattern.

26. A device according to claim 20, wherein the processor is adapted for executing said message recompositions in accordance with said recognized message patterns.

27. A device according to claim 26, wherein said parameter blocks respectively have a defined syntax; and wherein the processor is adapted for extracting from the received message for use in said message recomposition the parameters referenced by the predetermined message pattern recognized by the processor.

28. A device according to claim 20, wherein the processor is adapted for recomposing a plurality of different messages respectively repeating a common portion of said received message.

29. A device according to claim 19, wherein the NEDL file also defines resources of the network element in terms of information managed by said recomposed messages.

30. A device according to claim 29, wherein said resources definition includes constructs respectively defining descriptions of information pertaining to the resource, attributes of the information pertaining to the resource and those of said different message patterns that apply to the resource.

31. A device according to claim 30, wherein the processor is adapted for recognizing said predetermined message patterns within messages received from the network element and/or messages received for communication to the network element, and is adapted for executing said message recomposition in accordance with the recognized predetermined message pattern and in accordance with said resource constructs.

32. A computer readable storage medium for use with a processor included in a system for mediating information management in a communication network for communication with a network element having a given management-information protocol, wherein the storage medium is configured so as to define a structured network-element-description-language format for the given network element referencing information-management roles pertaining to the given network element in accordance with said network-element management-information protocol and thereby enable the processor to recompose messages received for communication to the network element to be in accordance with said network-element management-information protocol and to recompose messages received from the network element for further communication to be in accordance with a protocol that is different from said network-element management-information protocol;

wherein said network-element-description-language format includes a plurality of different predetermined message patterns respectively containing different combinations of references to blocks of parameters respectively having a defined syntax and an assigned information-management role.

33. A computer readable storage medium for use with a processor included in a system for mediating information management in a communication network for communication with a network element having a given management-information protocol, wherein the storage medium is configured so as to define a structured network-element-description-language format for the given network element referencing information-management roles pertaining to the given network element in accordance with said network-element management-information protocol and thereby enable the processor to recompose messages received for communication to the network element to be in accordance with said network-element management-information protocol and to recompose messages received from the network element for further communication to be in accordance with a protocol that is different from said network-element management-information protocol, and further configured so as to map an association between an operations-support-system protocol and the structured network-element-description-language format and thereby enable the processor to recompose said messages in accordance with said mapped association.

34. A computer readable storage medium for use with a processor included in a system for mediating information management in a communication network for communication with a network element having a given management-information protocol, wherein the storage medium is configured so as to define rules for causing the processor to recompose messages received for communication to the network element to be in accordance with said network-element management-information protocol and to recompose messages received from the network element for further communication to be in accordance with a protocol that is different from said network-element management-information protocol by causing the processor to extract parameters from the received message; to transform the extracted parameters to be in accordance with the protocol of the recomposed message; and to assign management roles to the recomposed message from the transformed parameters;

wherein said rules also cause the processor to recompose a plurality of different messages respectively repeating a common portion of said received message.

35. A system for mediating information management in a communications network between a network element having a given management-information protocol and a first operations support system and/or a second operations support systems respectively having different first and second management-information protocols that are different from the network-element management-information protocol, comprising a configurable mediation device for recomposing messages received for communication to the network element to be in accordance with said network-element management-information protocol, for recomposing messages received from the network element for communication to said first operations support system to be in accordance with said first operations-support-system management-information protocol and for recomposing messages received from the network element for communication to said second operations support system to be in accordance with said second operations-support-system management-information protocol; and a control unit for selectively causing the mediation device to be configured for recomposing messages received from the network element for communication to said first operations support system to be in accordance with said first operations-support-system management-information protocol and/or to be configured for recomposing messages received from the network element for communication to said second operations support system to be in accordance with said second operations-support-system management-information protocol;

wherein the control unit includes a configuration information file for defining the configuration of the mediation device.

36. A system for mediating information management in a communications network between a network element having a given management-information protocol and a first operations support system and/or a second operations support systems respectively having different first and second management-information protocols that are different from the network-element management-information protocol, comprising a configurable mediation device for recomposing messages received for communication to the network element to be in accordance with said network-element management-information protocol, for recomposing messages received from the network element for communication to said first operations support system to be in accordance with said first operations-support-system management-formation protocol and for recomposing messages received from the network element for communication to said second operations support system to be in accordance with said second operations-support-system management-information protocol; and a control unit for selectively causing the mediation device to be configured for recomposing messages received from the network element for communication to said first operations support system to be in accordance with said first operations-support-system management-information protocol and/or to be configured for recomposing messages received from the network element for communication to said second operations support system to be in accordance with said second operations-support-system management-information protocol:

wherein the mediation device comprises a NEDL file defining a structured network-element-description-language NEDL format referencing information-management roles pertaining to said network element in accordance with the management-information protocol of said network element and in accordance with an intermediate management-information protocol that is different from said network-element management-information protocol;

a NEDL processor coupled to the NEDL file for said recomposing of messages from or for communication to said network element, wherein the NEDL processor is coupled to the NEDL file for recomposing messages received for communication to said network element to be in accordance with the network-element management-information protocol and for recomposing messages received from said network element for further communication to be in accordance with said intermediate management-information protocol; and a first application interface device coupled to the NEDL processor for mediating information management for communications between the NEDL processor and said first operations support systems by recomposing messages received from the NEDL processor for communication to said first operations support system to be in accordance with the management-information protocol of said first operations support system and for recomposing messages received from said first operations support system for communication to the NEDL processor to be in accordance with the intermediate management-information protocol; and a second application interface device coupled to the NEDL processor for mediating information management for communications between the NEDL processor and said second operations support systems by recomposing messages received from the NEDL processor for communication to said second operations support system to be in accordance with the management-information protocol of said second operations support system and for recomposing messages received from said second operations support system for communication to the NEDL processor to be in accordance with the intermediate management-information protocol.

37. A system according to claim 36, wherein the control unit is adapted for configuring the mediation device to effect communications between the network element and either or both of the first and second operations support systems by selectively enabling or disabling communications between the NEDL processor and the first and second application interface devices respectively.

38. A system for mediating information management in a communications network between an operations support system having a given management-information protocol and a first network element and/or a second network element respectively having different management-information protocols that are different from the operations-support-system management-information protocol, comprising a configurable mediation device for recomposing messages received for communication to the first network element to be in accordance with said first network-element management-information protocol, for recomposing messages received for communication to the second network element to be in accordance with said second network-element management-information protocol, for recomposing messages received from the first network element for communication to said operations support system to be in accordance with said operations-support-system management-information protocol and for recomposing messages received from the second network element for communication to said operations support system to be in accordance with said operations-support-system management-information protocol; and a control unit for selectively causing the mediation device to be configured for recomposing messages received for communication to the first network element to be in accordance with said first network-element management-information protocol and for recomposing messages received from the first network element for communication to said operations support system to be in accordance with said operations-support-system management-information protocol and/or to be configured for recomposing messages received for communication to the second network element to be in accordance with said second network-element management-information protocol and for recomposing messages received from the second network element for communication to said operations support system to be in accordance with said operations-support-system management-information protocol;

wherein the control unit includes a configuration information file for defining the configuration of the mediation device.

39. A system for mediating information management in a communications network between an operations support system having a given management-information protocol and a first network element and/or a second network element respectively having different management-information protocols that are different from the operations-support-system management-information protocol, comprising a configurable mediation device for recomposing messages received for communication to the first network element to be in accordance with said first network-element management-information protocol, for recomposing messages received for communication to the second network element to be in accordance with said second network-element management-information protocol, for recomposing messages received from the first network element for communication to said operations support system to be in accordance with said operations-support-system management-information protocol and for recomposing messages received from the second network element for communication to said operations support system to be in accordance with said operations-support-system management-information protocol; and a control unit for selectively causing the mediation device to be configured for recomposing messages received for communication to the first network element to be in accordance with said first network-element management-information protocol and for recomposing messages received from the first network element for communication to said operations support system to be in accordance with said operations-support-system management-information protocol and/or to be configured for recomposing messages received for communication to the second network element to be in accordance with said second network-element management-information protocol and for recomposing messages received from the second network element for communication to said operations support system to be in accordance with said operations-support-system management-information protocol;

wherein the mediation device includes
a first NEDL file defining a structured network-element-description-language NEDL format referencing information-management roles pertaining to the first network element in accordance with said first network-element management-information protocol and in accordance with an intermediate management-information protocol that is different from said first network-element management-information protocol;

a second NEDL file defining a structured NEDL format referencing information-management roles pertaining to the second network element in accordance with said second network-element management-information protocol and in accordance with the intermediate management-information protocol;

a NEDL processor coupled to the first NEDL file for said recomposing of messages from or for communication to said first network element, wherein the NEDL processor is coupled to the first NEDL file for recomposing messages received for communication to said first network element to be in accordance with the first network-element management-information protocol and for recomposing messages received from said first network element for further communication to be in accordance with said intermediate management-information protocol and coupled to the second NEDL file for said recomposing of messages from or for communication to said second network element, wherein the NEDL processor is coupled to the second NEDL file for recomposing messages received for communication to said second network element to be in accordance with the second network-element management-information protocol and for recomposing messages received from said second network element for further communication to be in accordance with said intermediate management-information protocol; and an application interface device coupled to the NEDL processor for mediating information management for communications between the NEDL processor and said operations support system by recomposing messages received from the NEDL processor for communication to said operations support system to be in accordance with the management-information protocol of said operations support system and for recomposing messages received from said operations support system for communication to the NEDL processor to be in accordance with the intermediate management-information protocol.

40. A system according to claim 39, wherein the control unit is adapted for configuring the mediation device to effect communications between the operations support system and either or both of the first and second network elements by selectively enabling or disabling communications between the NEDL processor and the first and second NEDL files respectively.

41. A system for mediating information management in a communications network between an operations support system having a given management-information protocol and a first network element and/or a second network element respectively having different management-information protocols that are different from the operations-support system management-information protocol, comprising a configurable mediation device for recomposing messages received for communication to the first network element to be in accordance with said first network-element management-information protocol, for recomposing messages received for communication to the second network element to be in accordance with said second network-element management-information protocol, for recomposing messages received from the first network element for communication to said operations support system to be in accordance with said operations-support-system management-information protocol and for recomposing messages received from the second network element for communication to said operations support system to be in accordance with said operations-support-system management-information protocol; and a control unit for selectively causing the mediation device to be configured for recomposing messages received for communication to the first network element to be in accordance with said first network-element management-information protocol and for recomposing messages received from the first network element for communication to said operations support system to be in accordance with said operations-support-system management-information protocol and/or to be configured for recomposing messages received for communication to the second network element to be in accordance with said second network-element management-information protocol and for recomposing messages received from the second network element for communication to said operations support system to be in accordance with said operations-support-system management-information protocol;

wherein the mediation device includes a first NEDL file defining a structured network-element-description-language NEDL format referencing information-management roles pertaining to the first network element in accordance with said first network-element management-information protocol and in accordance with an intermediate management-information protocol that is different from said first network-element management-information protocol;

a second NEDL file defining a structured NEDL format referencing information-management roles pertaining to the second network element in accordance with said second network-element management-information protocol and in accordance with the intermediate management-information protocol;

a first NEDL processor coupled to the first NEDL file for said recomposing of messages from or for communication to said first network element, wherein the NEDL processor is coupled to the first NEDL file for recomposing messages received for communication to said first network element to be in accordance with the first network-element management-information protocol and for recomposing messages received from said first network element for further communication to be in accordance with said intermediate management-information protocol;

a second NEDL processor coupled to the second NEDL file for said recomposing of messages from or for communication to said second network element, wherein the NEDL processor is coupled to the second NEDL file for recomposing messages received for communication to said second network element to be in accordance with the second network-element management-information protocol and for recomposing messages received from said second network element for further communication to be in accordance with said intermediate management-information protocol; and an application interface device coupled to the first NEDL processor for mediating information management for communications between the first NEDL processor and said operations support system by recomposing messages received from the first NEDL processor for communication to said operations support system to be in accordance with the management-information protocol of said operations support system and for recomposing messages received from said operations support system for communication to the first NEDL processor to be in accordance with the intermediate management-information protocol and coupled to the second NEDL processor for mediating information management for communications between the second NEDL processor and said operations support system by recomposing messages received from the second NEDL processor for communication to said operations support system to be in accordance with the management-information protocol of said operations support system and for recomposing messages received from said operations support system for communication to the second NEDL processor to be in accordance with the intermediate management-information protocol.

42. A system according to claim 41, wherein the control unit is adapted for configuring the mediation device to effect communications between the operations support system and either or both of the first and second network elements by selectively enabling or disabling communications between the first NEDL processor and either the first NEDL file or the application interface device and/or between the second NEDL processor and either the second NEDL file or the application interface device respectively.

43. A system for mediating information management in a communications network between a plurality of network elements respectively having different management-information protocols and one or more operations support systems respectively having different management-information protocols, comprising a plurality of configurable mediation devices for recomposing messages received for communication to the respective network elements to be in accordance with the network-element management-information protocol of the respective network element and for recomposing messages received from the respective network elements for communication to the respective one or more operations support systems to be in accordance with the operations-support-system management-information protocol for the respective operations support system; and a control unit coupled to the mediation devices for causing the mediation devices to be configured for communication between different combinations of selected network elements and selected operations support systems by selectively causing the respective mediation devices to be configured for recomposing messages received for communication to the selected network element to be in accordance with the network-element management-information protocol for the selected network element and to be configured for recomposing messages received from the selected network element for communication to the selected operations support system to be in accordance with said operations-support-system management-information protocol for the selected operations support system;

wherein the control unit includes a configuration information file for defining the configuration of each mediation device.

44. A system for mediating information management in a communications network between a plurality of network elements respectively having different management-information protocols and one or more operations support systems respectively having different management-information protocols, comprising a plurality of configurable mediation devices for recomposing messages received for communication to the respective network elements to be in accordance with the network-element management-information protocol of the respective network element and for recomposing messages received from the respective network elements for communication to the respective one or more operations support systems to be in accordance with the operations-support-system management-information protocol for the respective operations support system; and a control unit coupled to the mediation devices for causing the mediation devices to be configured for communication between different combinations of selected network elements and selected operations support systems by selectively causing the respective mediation devices to be configured for recomposing messages received for communication to the selected network element to be in accordance with the network-element management-information protocol for the selected network element and to be configured for recomposing messages received from the selected network element for communication to the selected operations support system to be in accordance with said operations-support-system management-information protocol for the selected operations support system;

wherein the mediation device includes a plurality of NEDL files respectively defining a structured network-element-description-language NEDL format referencing information-management roles pertaining to the network elements in accordance with the different management-information protocols of the network elements and in accordance with an intermediate management-information protocol that is different from said network-element management-information protocols;

a NEDL processor coupled to the NEDL files for said recomposing of messages from or for communication to said network elements, wherein the NEDL processor is coupled to the respective NEDL file for recomposing messages received for communication to the respective network element to be in accordance with the management-information protocol of the respective network element and for recomposing messages received from said network elements for further communication to be in accordance with an intermediate management-information protocol; and application interface devices for each of the different operations-support-system protocols, wherein the application interface devices are respectively coupled to the NEDL processor for mediating information management for communications between the NEDL processor and said operations support systems by recomposing messages received from the NEDL processor for communication to said operations support devices to be in accordance with the management-information protocols of said operations support system and for recomposing messages received from said operations support system for communication to the NEDL processor to be in accordance with the intermediate management-information protocol.

45. A system according to claim 44, wherein the control unit is adapted for configuring the mediation units to effect communications between the operations support systems and the respective network elements by selectively enabling or disabling communications between the NEDL processor and the respective NEDL files, or by selectively enabling or disabling communications between the NEDL processor and the respective application interface device(s).

46. A configurable system for mediating information management in a communications network between a first network element and/or a second network element respectively having different first and/or second management-information protocols and a first operations support system and/or a second operations support system respectively having different first and second management-information protocols that are different from the first and/or second network-element management-information protocols, comprising a first mediation device for recomposing messages received for communication to the first network element to be in accordance with said first network-element management-information protocol and for recomposing messages received from the first network element for communication to said first operations support system to be in accordance with said first operations-support-system management-information protocol;

a second mediation device for recomposing messages received for communication to the first network element to be in accordance with said first network-element management-information protocol and for recomposing messages received from the first network element for communication to said second operations support system to be in accordance with said second operations-support-system management-information protocol;

a third mediation device for recomposing messages received for communication to the second network element to be in accordance with said second network-element management-information protocol and for recomposing messages received from the second network element for communication to said first operations support system to be in accordance with said first operations-support-system management-information protocol;

a fourth mediation device for recomposing messages received for communication to the second network element to be in accordance with said second network-element management-information protocol and for recomposing messages received from the second network element for communication to said second operations support system to be in accordance with said second operations-support-system management-information protocol;

circuit means for selectively connecting the first mediation device between the first network element and the first operations support system, connecting the second mediation device between the first network element and the second operations support system, connecting the third mediation device between the second network element and the first operations support system, and/or connecting the fourth mediation device between the second network element and the second operations support system; and a control unit coupled to the circuit means for selectively causing the circuit means to connect the first mediation device between the first network element and the first operations support system, connect the second mediation device between the first network element and the second operations support system, connect the third mediation device between the second network element and the first operations support system, and/or connect the fourth mediation device between the second network element and the second operations support system.

47. A system according to claim 46, wherein the control unit includes a configuration information file for defining said selective connections.

48. A system according to claim 46, wherein at least a given one of the mediation devices comprises a NEDL file defining a structured network-element-description-language NEDL format referencing information-management roles pertaining to a given one of said network elements in accordance with the management-information protocol of said given one network element; and a NEDL processor coupled to the NEDL file for said recomposing of messages from or for communication to said given one network element.

49. A system according to claim 48, wherein the NEDL file also defines the structured NEDL format in accordance with an intermediate management-information protocol that is different from said management-information protocol of said given one network element; and the NEDL processor is coupled to the NEDL file for recomposing messages received for communication to said given one network element to be in accordance with the management-information protocol of said given one network element and for recomposing messages received from said given one network element for further communication to be in accordance with said intermediate management-information protocol; and wherein said at least given one mediation device further comprises an application interface device coupled to the NEDL processor for mediating information management for communications between the NEDL processor and a given one of said operations support systems by recomposing messages received from the NEDL processor for communication to said given one operations support system to be in accordance with the management-information protocol of said given one operations support system and for recomposing messages received from said given one operations support system for communication to the NEDL processor to be in accordance with the intermediate management-information protocol.

* * * * *